United States Patent
Sato et al.

(10) Patent No.: US 7,775,268 B2
(45) Date of Patent: Aug. 17, 2010

(54) VEHICLE COOLING SYSTEM

(75) Inventors: Yousuke Sato, Yokosuka (JP); Takayuki Ishikawa, Yokohama (JP); Mitsuru Iwasaki, Sagamihara (JP)

(73) Assignees: Nissan Motor Co., Ltd., Yokohama-shi, Kanagawa (JP); Calsonic Kansei Corporation, Nakano-ku, Tokyo (JP)

( * ) Notice: Subject to any disclaimer, the term of this patent is extended or adjusted under 35 U.S.C. 154(b) by 1060 days.

(21) Appl. No.: 11/337,437

(22) Filed: Jan. 24, 2006

(65) Prior Publication Data
US 2006/0196634 A1 Sep. 7, 2006

(30) Foreign Application Priority Data
Feb. 18, 2005 (JP) .............................. 2005-042963

(51) Int. Cl.
*F28F 27/00* (2006.01)
*F01P 7/14* (2006.01)
(52) U.S. Cl. ........................... 165/202; 165/41; 165/51; 165/293; 165/288; 165/297; 165/298; 165/294; 165/300; 165/134.1; 236/34.5; 123/41.1; 123/41.15; 123/41.57
(58) Field of Classification Search ................. 123/41.1, 123/41.15, 41.57; 236/34.5; 165/41, 51, 165/293, 297, 298, 290, 294, 300, 202, 288, 165/134.1
See application file for complete search history.

(56) References Cited
U.S. PATENT DOCUMENTS
6,267,349 B1 * 7/2001 Gomes et al. ............. 251/30.04
6,684,826 B2 * 2/2004 Yoshikawa et al. ......... 123/41.1
6,845,627 B1 * 1/2005 Buck ........................... 165/919
6,857,576 B2 2/2005 Peter
2004/0206489 A1 10/2004 Iwasaki et al.

FOREIGN PATENT DOCUMENTS

| JP | H05-231148 A | 9/1993 |
| JP | H06-088525 A | 3/1994 |
| JP | 2000-027646 A | 1/2000 |
| JP | 2003-003846 A | 1/2003 |
| JP | 2003-083064 A | 3/2003 |
| JP | 2003-239745 A | 8/2003 |
| JP | 2004-239591 A | 8/2004 |
| JP | 2004-293982 A | 10/2004 |
| JP | 2006-172962 A | 6/2006 |

* cited by examiner

*Primary Examiner*—John K Ford
(74) *Attorney, Agent, or Firm*—Global IP Counselors, LLP

(57) ABSTRACT

A vehicle cooling system comprises a vehicle unit, a heat exchanger, a cooling fan, a coolant pump, a three-way valve, and a control unit. The heat exchanger is arranged in the coolant route to selectively receive a coolant from the coolant outlet of the vehicle unit. The cooling fan is arranged to blow cooling air to the heat exchanger. The coolant pump is arranged to circulate the coolant through the coolant route. The three-way valve is arranged to switch the coolant route between a heat exchanger route that passes through the heat exchanger and a bypass route that bypasses the heat exchanger. The control unit is configured to control operation of at least one of the cooling fan, the three-way valve and the coolant pump based on a temperature of the coolant at the heat exchanger and a temperature of the coolant at the coolant outlet of the vehicle unit.

9 Claims, 10 Drawing Sheets

VEHICLE COOLING SYSTEM

CROSS-REFERENCE TO RELATED APPLICATIONS

This application claims priority under 35 U.S.C. §119 to Japanese Patent Application No. 2005-042963. The entire disclosure of Japanese Patent Application No. 2005-042963 is hereby incorporated herein by reference.

BACKGROUND OF THE INVENTION

1. Field of the Invention

The present invention relates to a vehicle cooling system for removing heat generated by a vehicle unit (i.e., for cooling the vehicle unit). More particularly, the present invention relates to a vehicle cooling system configured and arranged to prevent thermal shock from occurring in a heat exchanger that is used to remove heat generated by a vehicle unit.

2. Background Information

In recent years, fuel cell automobiles have been developed which operate at high efficiencies and employ larger heat exchangers than gasoline engines due to the large quantity of heat emitted. A conventional vehicle cooling system of a fuel cell automobile is configured and arranged to circulate a coolant to a vehicle unit such as a fuel cell and other components to cool the vehicle unit. The coolant is circulated through a coolant circuit or route by a coolant pump. The coolant temperature increases when the coolant passes through the vehicle unit and the coolant releases heat as the coolant passes through a heat exchanger. A three-way valve is provided in the coolant circuit such that the three-way valve is switched between a heat exchanger position that directs the coolant through the heat exchanger and a bypass position that directs to coolant to bypass the heat exchanger. In the conventional vehicle cooling system, the temperature of the coolant at an outlet of the vehicle unit is detected and the three-way valve is switched to the heat exchanger position when the temperature of the coolant at the outlet of the vehicle unit is equal to or above a prescribed value. When the temperature of the coolant at the outlet of the vehicle unit is below the prescribed value, the three-way valve is switched to the bypass position so that the coolant bypasses the heat exchanger.

One known example of such conventional vehicle cooling system is disclosed in Japanese Laid-Open Patent Publication No. 2003-239745. The vehicle cooling system presented in this reference is provided with a thermostat that opens and closes automatically as a temperature of an engine coolant changes. The opening and closing of the thermostat controls an engine temperature by regulating a flow rate of coolant passing through a radiator (i.e., a heat exchanger).

A known example of a heat exchanger used in such conventional vehicle cooling system is disclosed in Japanese Laid-Open Patent Publication No. 2004-293982. This reference discloses a heat exchanger or a radiator having a pair of sheet plates arranged opposite to each other with a predetermined distance interposed therebetween at top and bottom positions of the radiator. A plurality of tubes and a plurality of corrugated fins are alternately arranged with a predetermined space interposed therebetween in a direction of the width of the radiator between the sheet plates.

In view of the above, it will be apparent to those skilled in the art from this disclosure that there exists a need for an improved vehicle cooling system. This invention addresses this need in the art as well as other needs, which will become apparent to those skilled in the art from this disclosure.

SUMMARY OF THE INVENTION

The conventional vehicle cooling system disclosed in Japanese Laid-Open Patent Publication No. 2004-293982 mentioned above is provided with the electronically controllable three-way valve, the coolant pump, and the cooling fan. Such conventional vehicle cooling system is configured and arranged to maintain a constant coolant temperature by precisely controlling an opening degree of the three-way valve, a rotational speed of the coolant pump, and/or a rotational speed of the cooling fan.

The problem with such conventional vehicle cooling system is that when the coolant temperature at the outlet of the vehicle unit becomes high, the three-way valve is immediately switched to the heat exchanger position to open the coolant route that directs the coolant through the heat exchanger. If a difference between the coolant temperature at the outlet of the vehicle unit and the coolant temperature inside the heat exchanger is large, the heat exchanger will undergo thermal shock.

Particularly in the case of a fuel cell vehicle that operates at high efficiency, the heat exchanger is large and the thermal shock performance is poor (i.e., more susceptible to thermal shock) because it is easier for a temperature difference to occur within the heat exchanger. Also, in the case of a heat exchanger in which a coolant flows sideways across the heat exchanger, the tube portion of the heat exchanger is typically long. Thus, the thermal shock performance is poor because the amount of elongation of the tube is large. Furthermore, in fuel cell vehicles and hybrid vehicles, two or more heat exchangers are sometimes combined and used as a single heat exchanger unit because the vehicle cooling system has a plurality of cooling circuits. In such cases, the portions where the heat exchangers are welded together have poor thermal shock performance.

The cooling system disclosed in Japanese Laid-Open Patent Publication No. 2004-293982 is designed to improve the cooling efficiency and does not take into account the effects of thermal shock. Thus, there is the possibility that a coolant temperature difference that exceeds the standalone thermal shock tolerance of the heat exchanger (e.g., 40° C. or larger) will occur.

Meanwhile, the heat exchanger disclosed in Japanese Laid-Open Patent Publication No. 2004-293982 mentioned above requires the structure of the heat exchanger to be strengthened in order to make it resistant to thermal shock, which introduces the additional problems of increased cost and increased weight.

The present invention is conceived in view of the aforementioned problems. Accordingly, one object of the present invention is to provide a vehicle cooling system that is configured and arranged to prevent thermal shock from occurring in a heat exchanger.

In order to achieve the above object and other objects of the present invention, a vehicle cooling system is provided that comprises a vehicle unit, a heat exchanger, a cooling fan, a coolant pump, a three-way valve, and a control unit. The vehicle unit has a coolant outlet and a coolant inlet with a coolant route therebetween. The heat exchanger is configured and arranged in the coolant route to selectively receive a coolant from the coolant outlet of the vehicle unit. The cooling fan is configured and arranged to blow cooling air to the heat exchanger. The coolant pump is configured and arranged to circulate the coolant through the coolant route. The three-way valve is configured and arranged to switch the coolant route between a heat exchanger route that passes through the heat exchanger and a bypass route that bypasses the heat exchanger. The control unit is configured to control operation of at least one of the cooling fan, the three-way valve and the coolant pump based on a temperature of the coolant at the heat exchanger and a temperature of the coolant at the coolant outlet of the vehicle unit.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
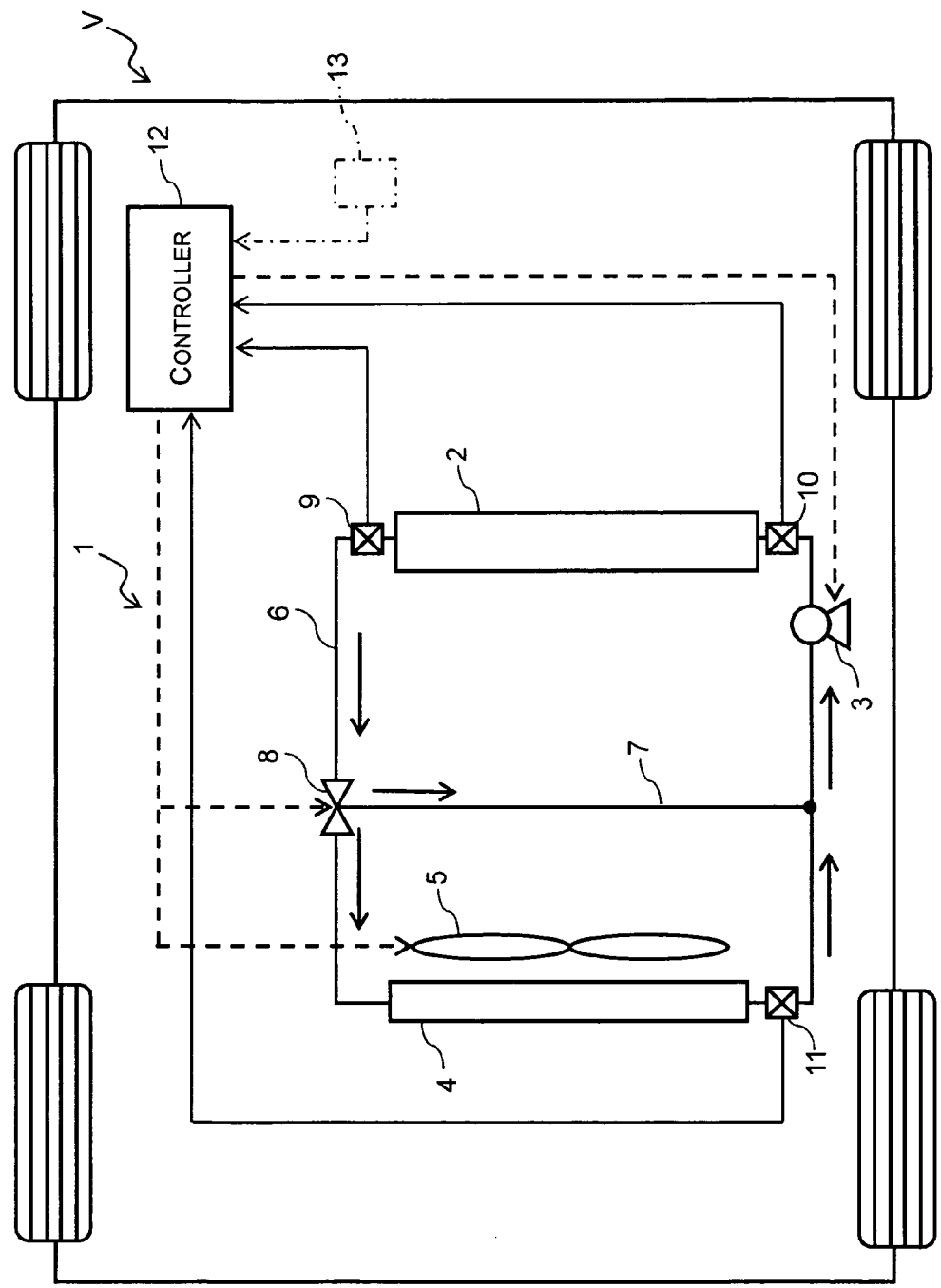
FIG. 1 is a block diagram illustrating constituent components of a vehicle cooling system in accordance with a first embodiment of the present invention.

Referring initially to FIG. 1, a vehicle cooling system 1 is illustrated in accordance with a first embodiment of the present invention. FIG. 1 is a block diagram showing the constituent components of the vehicle cooling system 1 installed in a host vehicle V in accordance with a first embodiment. As shown in FIG. 1, the vehicle cooling system 1 in accordance with the first embodiment comprises a vehicle unit 2, a coolant pump 3, a heat exchanger 4, a cooling fan 5, a three-way valve 8, an outlet temperature sensor 9, an inlet temperature sensor 10, a heat exchanger temperature sensor 11, and a control unit or controller 12. Moreover, a vehicle speedometer 13 can be provided to detect a traveling speed of the host vehicle V and to send a detected traveling speed to the controller 12.

The vehicle unit 2 is, for example, a fuel cell, an electric motor or the like, that emits heat.

The coolant pump 3 is configured and arranged to circulate a coolant throughout a coolant route of the vehicle cooling system 1. The coolant pump 3 is preferably a water pump for circulating the coolant. The coolant pump 3 is operatively coupled to the controller 12 such that a rotational speed of the coolant pump 3 is electrically controlled by the controller 12.

The heat exchanger 4 is configured and arranged to cool the coolant by radiating away the heat of the coolant that is flowing from the vehicle unit 2 via a coolant pipe 6. The heat exchanger 4 is preferably a radiator or other conventional heat radiating device. The heat exchanger 4 is configured and arranged to cool the coolant by discharging the heat of the coolant to cooling air blown from the cooling fan 5. The heat exchanger 4 is a conventional component that is well known in the art. Since the heat exchanger 4 is well known in the art, the structure will not be discussed or illustrated in detail herein. Rather, it will be apparent to those skilled in the art from this disclosure that the component can be any type of structure and/or programming that can be used to carry out the present invention.

The cooling fan 5 is configured and arranged to blow the cooling air across the heat exchanger 4. The cooling fan 5 is operatively coupled to the controller 12 such that a rotational speed of the cooling fan 5 is electronically controlled by the controller 12.

The three-way valve 8 is configured and arranged to switch the coolant route between a heat exchanger route and a bypass route. When the three-way valve 8 is positioned so that the coolant route is switched to the heat exchanger route, the coolant circulating in the coolant route via the coolant pipe 6 passes through the heat exchanger 4. When the three-way valve 8 is positioned so that the coolant route is switched to the bypass route, the coolant circulating in the coolant route bypasses the heat exchanger 4 via a bypass pipe 7. In other words, the three-way valve 8 is configured and arranged to select which coolant route (i.e., the heat exchanger route or the bypass route) the coolant that circulates thereto via the coolant pipe 6 will follow. The three-way valve 8 is operatively coupled to the controller 12 such that a switching direction (i.e., switching operation between the heat exchanger route and the bypass route) and an opening speed of the three-way valve 8 is electronically controlled by the controller 12. The three-way valve 8 is configured and arranged to accomplish switching of the coolant route by opening an internal valve element to one of the heat exchanger route and the bypass route (while also closing the other one of the heat exchanger route and the bypass route in an interlocking manner). In particular, when the three-way valve 8 is switched to the heat exchanger route that passes through the heat exchanger 4, the opening speed of the three-way valve 8 is preferably controlled in a continuously variable manner by the controller 12. The three-way valve 8 is a conventional component that is well known in the art. Since the three-way valve 8 is well known in the art, the structure will not be discussed or illustrated in detail herein. Rather, it will be apparent to those skilled in the art from this disclosure that the component can be any type of structure and/or programming that can be used to carry out the present invention.

The outlet temperature sensor 9 is configured and arranged to detect the coolant temperature at a coolant outlet of the vehicle unit 2. More specifically, the outlet temperature sensor 9 is configured to detect a coolant outlet temperature TWO of the vehicle unit 2 and send a resulting detection signal to the controller 12.

The inlet temperature sensor 10 is configured and arranged to detect the coolant temperature at a coolant inlet of the vehicle unit 2. More specifically, the inlet temperature sensor 10 is configured to detect a coolant inlet temperature TWI of the vehicle unit 2 and send a resulting detection signal to the controller 12.

The heat exchanger temperature sensor 11 is configured and arranged to detect the coolant temperature at the heat exchanger 4. More specifically, the heat exchanger temperature sensor 11 is configured to detect a coolant temperature TRW at the heat exchanger 4 and send a resulting detection signal to the controller 12.

The controller 12 is configured to control operations of the coolant pump 3, the cooling fan 5, and the three-way valve 8 based on the coolant outlet temperature TWO, the coolant inlet temperature TWI, and/or the coolant temperature TRW at the heat exchanger 4 detected by the outlet temperature sensor 9, the inlet temperature sensor 10 and the heat exchanger temperature sensor 11, respectively. More specifically, the controller 12 is configured to control at least one of the rotational speed of the coolant pump 3, the rotational speed of the cooling fan 5, and the opening/closing operation and the opening speed of the three-way valve 8 based on the values detected by the outlet temperature sensor 9, the inlet temperature sensor 10, the heat exchanger temperature sensor 11, the vehicle speedometer 13, an outside air temperature sensor 92 (FIG. 9), and/or other detecting devices (not shown).

The controller 12 preferably includes a microcomputer with a CPU with a thermal shock prevention processing control program that controls at least one of the coolant pump 3, the cooling fan 5, and the three-way valve 8 as discussed below. The controller 12 also preferably includes other conventional components such as an input interface circuit, an output interface circuit, and storage devices such as a ROM (Read Only Memory) device and a RAM (Random Access Memory) device. The microcomputer of the controller 12 is programmed to control the coolant pump 3, the cooling fan 5, and the three-way valve 8 in accordance with the thermal shock prevention processing as discussed below. The memory circuit stores processing results and control programs such as ones for thermal shock prevention operation that are run by the processor circuit. The controller 12 is operatively coupled to the coolant pump 3, the cooling fan 5, the three-way valve 8, the outlet temperature sensor 9, the inlet temperature sensor 10, and the heat exchanger temperature sensor 11 in a conventional manner. The internal RAM of the controller 12 stores statuses of operational flags and various control data. The internal ROM of the controller 12 stores the control program and/or maps and data for various operations. The controller 12 is capable of selectively controlling any of the components of the control system in accordance with the control program. It will be apparent to those skilled in the art from this disclosure that the precise structure and algorithms for the controller 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Generally, the controller 12 is configured to detect the coolant outlet temperature TWO at the outlet of the vehicle unit 2 and when the coolant outlet temperature TWO at the outlet of the vehicle unit 2 is equal to or above a predetermined value, the controller 12 is configured to operate the three-way valve 8 to switch the coolant route to the heat exchanger route that directs the coolant through the heat exchanger 4 so that the coolant is cooled. On the other hand, when the coolant outlet temperature TWO at the outlet of the vehicle unit 2 is below the predetermined value, the controller 12 is configured to operate the three-way valve 8 to switch the coolant route to the bypass route so that the coolant bypasses the heat exchanger 4 via the bypass pipe 7 and the coolant does not flow to the heat exchanger 4.

The thermal shock prevention processing executed in the controller 12 of the vehicle cooling system 1 in accordance with the first embodiment in order to prevent thermal shock from occurring will now be explained with reference to the flowchart of FIG. 2 and the diagram shown in FIG. 3.

Figure 2:
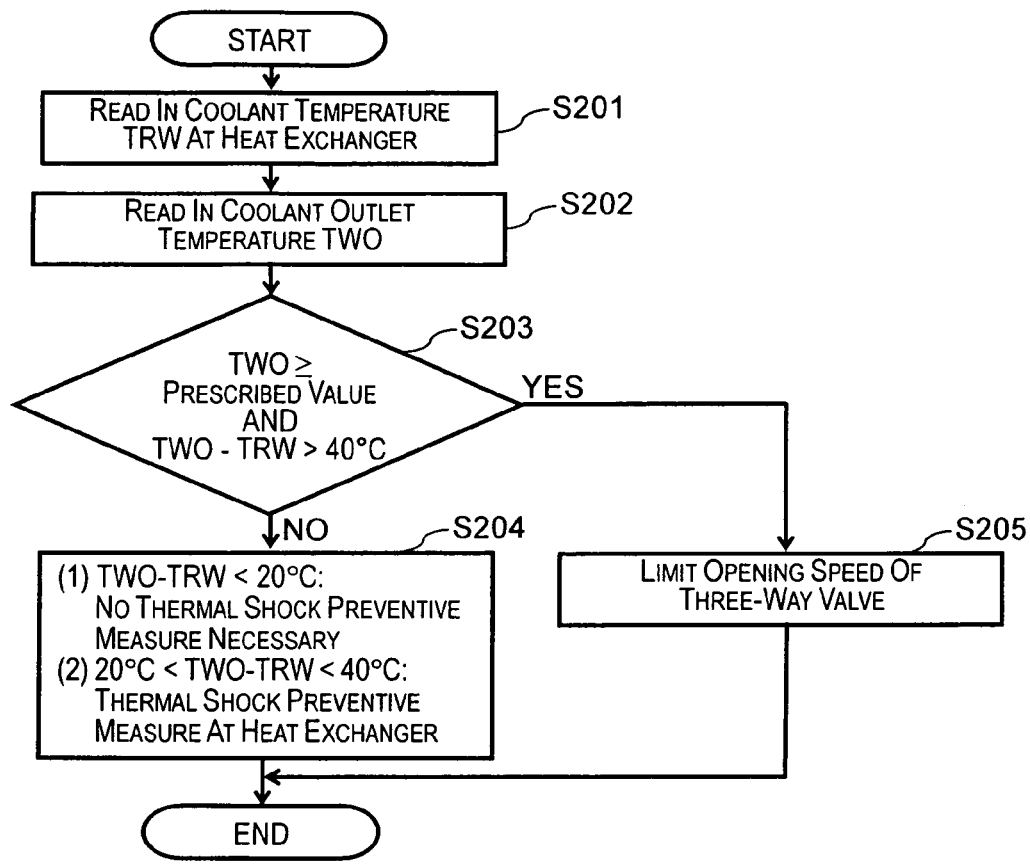
FIG. 2 is a flowchart showing a thermal shock prevention processing executed by a control unit of the vehicle cooling system in accordance with the first embodiment of the present invention.

As shown in FIG. 2, the controller 12 is first configured to read in the coolant temperature TRW at the heat exchanger 4 detected by the heat exchanger temperature sensor 11 (step S201). The controller 12 is then configured to read in the coolant outlet temperature TWO detected by the outlet temperature sensor 9 (step S202).

Next, the controller 12 is configured to determine if the coolant outlet temperature TWO of the vehicle unit 2 is equal to or above a prescribed value and a difference between the coolant outlet temperature TWO and the coolant temperature TRW at the heat exchanger 4 (i.e., TWO-TRW) is larger than 40° C. (step S203).

When the conditions of step S203 are not satisfied (i.e., NO in step S203), the controller 12 is configured to proceed to step S204. In step S204, the controller 12 is configured to determine that the thermal shock preventive measure does not have to be taken if the difference between the coolant outlet temperature TWO and the coolant temperature TRW at the heat exchanger 4 is less than 20° C. On the other hand, if the difference between the coolant outlet temperature TWO and the coolant temperature TRW at the heat exchanger 4 is larger than 20° C. and smaller than 40° C. in step S204, the controller 12 is configured to determine the thermal shock can be avoided with a preventive measure at the heat exchanger 4, and thus, the thermal shock prevention in accordance with the present invention need not be executed. After step S204, the controller 12 is configured to end the thermal shock prevention processing.

On the other hand, if the controller 12 determines in step S203 that the coolant outlet temperature TWO of the vehicle unit 2 is equal to or above the prescribed value and the difference between the coolant outlet temperature TWO and the coolant temperature TRW at the heat exchanger 4 is larger than 40° C., the controller 12 is configured to limit the opening speed (%/s) with which the three-way valve 8 switches the coolant route to the heat exchanger route that directs the coolant through the heat exchanger 4 based on the difference between the coolant outlet temperature TWO and the coolant temperature TRW at the heat exchanger 4 (step S205).

Figure 3:
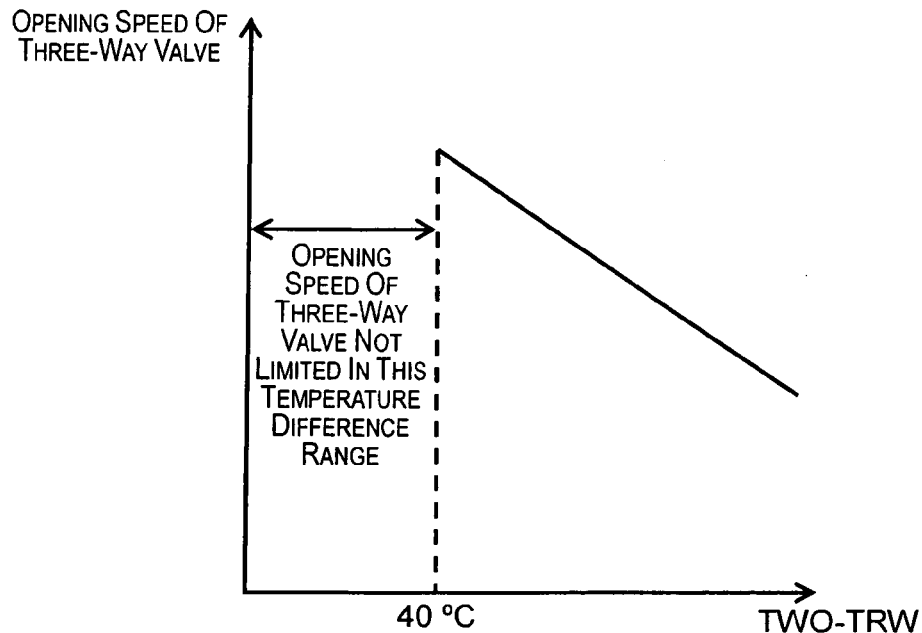
FIG. 3 is a schematic diagram illustrating a manner in which an opening speed of a three-way valve is limited based on a difference between a temperature of a coolant at a coolant outlet of a vehicle unit and a temperature of the coolant at a heat exchanger in the vehicle cooling system in accordance with the first embodiment of the present invention.

The manner in which the opening speed of the three-way valve 8 is limited in step S205 is illustrated in the diagram of FIG. 3. When the difference between the coolant outlet temperature TWO and the coolant temperature TRW at the heat exchanger 4 is larger than 40° C., the opening speed at which the three-way valve 8 switches the coolant route to the heat exchanger route is reduced in accordance with the magnitude of the temperature difference (TWO-TRW) such that the larger the temperature difference is, the slower the opening speed becomes. The opening speed of the three-way valve 8 is expressed as a percentage (%) of the three-way valve 8 to be opened per unit time (second). When the temperature difference is smaller than 40° C., the opening speed at which the three-way valve 8 switches to the coolant route that passes through the heat exchanger 4 is not limited and the three-way valve 8 opens at a normal opening speed.

After controlling the opening speed of the three-way valve 8 based on the temperature difference between the coolant outlet temperature TWO and the coolant temperature TRW at the heat exchanger 4 in step S205, the controller 12 is configured to end the thermal shock prevention processing.

Accordingly, the vehicle cooling system 1 according to the first embodiment is able to limit or control a flow rate of the coolant flowing into the heat exchanger 4 based on the coolant temperature TRW at the heat exchanger 4 and the coolant outlet temperature TWO of the vehicle unit 2. As a result, the vehicle cooling system 1 can prevent a severe temperature difference from occurring inside the heat exchanger 4, thereby preventing the heat exchanger 4 from being damaged due to thermal shock.

Also, since the vehicle cooling system 1 according to the first embodiment uses the electronically controllable three-way valve 8, the controller 12 can control the flow rate of the coolant flowing into the heat exchanger 4 by controlling the opening speed with which the three-way valve 8 switches the coolant route to the heat exchanger route that passes through the heat exchanger 4. As a result, the vehicle cooling system 1 can prevent a severe temperature difference from occurring inside the heat exchanger 4, thereby preventing the heat exchanger 4 from being damaged due to thermal shock.

The vehicle cooling system 1 according to the first embodiment is further configured to control the opening speed of the three-way valve 8 such that the opening speed with which the three-way valve 8 switches the coolant route to the heat exchanger route becomes slower as the difference between the coolant outlet temperature TWO at the outlet of the vehicle unit 2 and the coolant temperature TRW at the heat exchanger 4 becomes larger. As a result, the vehicle cooling system 1 can prevent the heat exchanger 4 from being damaged due to thermal shock while holding the decrease in the flow rate of the coolant flowing to the heat exchanger 4 to a minimum degree.

Second Embodiment

Figure 4:
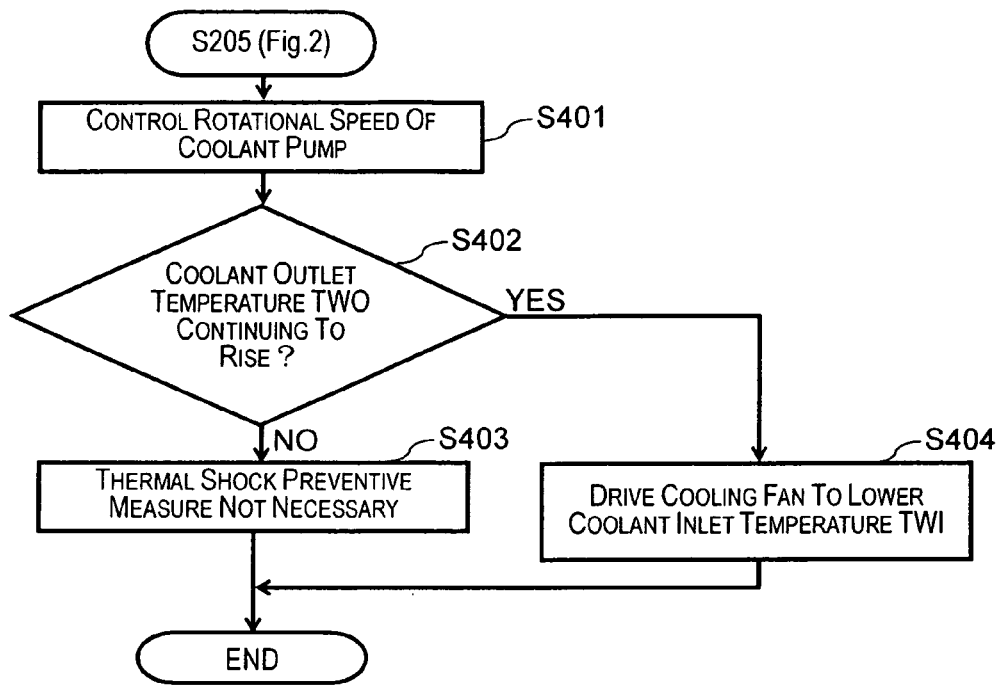
FIG. 4 is a flowchart showing a thermal shock prevention processing executed by the control unit of the vehicle cooling system in accordance with a second embodiment of the present invention.
Figure 5:
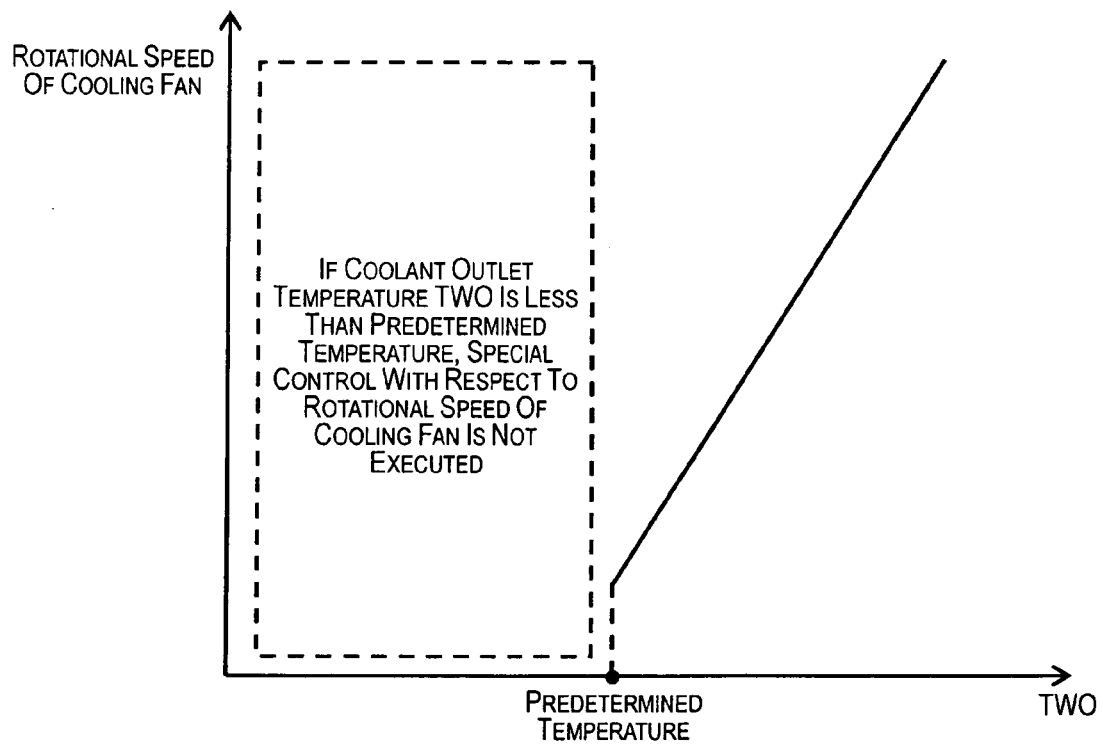
FIG. 5 is a schematic diagram illustrating a manner in which a rotational speed of a cooling fan is controlled based on the temperature of the coolant at the coolant outlet of the vehicle unit in the vehicle cooling system in accordance with the second embodiment of the present invention.

Referring now to FIGS. 4 and 5, a second embodiment of the present invention will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment of the present invention is basically identical to the first embodiment except for the control process executed in the controller 12. More specifically, the control process in accordance with the second embodiment is identical to the control process in accordance with the first embodiment illustrated in the flowchart of FIG. 2 except that an additional control is executed after step S205 of FIG. 2. Thus, the constituent components of the vehicle cooling system 1 in accordance with the second embodiment are the same as those of the first embodiment shown in FIG. 1 and detailed descriptions thereof are omitted for the sake of brevity.

FIG. 4 is a flowchart showing the computer processing that follows step S205 of FIG. 2 in accordance with the second embodiment in order to further prevent thermal shock from occurring. Since the processing steps of the second embodiment are the same as the processing steps of the first embodiment shown in the flowchart of FIG. 2 up to step S205, FIG. 4 shows only the steps that follow step S205 and explanations of the steps preceding and including step S205 are omitted for the sake of brevity.

In the second embodiment, the thermal shock prevention processing shown in FIG. 2 is executed and once step S205 is reached and control of the flow rate of the coolant flowing to the heat exchanger 4 (i.e., control of the opening speed of the three-way valve 8) commences, the controller 12 proceeds to step S401. In step S401, the controller 12 is configured to control the rotational speed of the coolant pump 3.

More specifically, in step S401, the controller 12 is configured to lower the rotational speed of the coolant pump 3 to prevent the coolant having a substantially higher temperature than the coolant at the heat exchanger 4 from flowing into the heat exchanger 4 and causing thermal shock to occur. Since lowering the rotational speed of the coolant pump 3 causes the flow rate of the coolant to decrease, there is a possibility that the amount of heat radiated from the heat exchanger 4 will decrease and the coolant outlet temperature TWO of the vehicle unit 2 will increase. Therefore, in step S402, the controller 12 is configured determine if the coolant outlet temperature TWO is continuing to increase. One way to make this determination is to set a prescribed threshold value for the coolant outlet temperature TWO and determine if the coolant outlet temperature TWO has exceeded the threshold value. Another way is to monitor a rate of change (° C./s) of the coolant outlet temperature TWO and to determine if the monitored rate of change exceeds a prescribed rate of change.

If the controller 12 determines in step S402 that the coolant outlet temperature TWO is not rising, the controller 12 is configured to determine that a special thermal shock preventive measure is not necessary (step S403) and to end the thermal shock prevention processing in accordance with the present invention.

On the other hand, if the controller 12 determines that the coolant outlet temperature TWO is continuing to rise in step S402, the controller 12 is configured to control the rotational speed of the cooling fan 5 based on the coolant outlet temperature TWO so that the coolant inlet temperature TWI of the vehicle unit 2 will be lowered (step S404). As mentioned above, the coolant inlet temperature TWI of the vehicle unit 2 is detected by the inlet temperature sensor 10.

The manner in which the rotational speed of the cooling fan 5 is controlled in step S404 is illustrated in the diagram of FIG. 5. The cooling fan 5 is started when the coolant outlet temperature TWO reaches or exceeds a predetermined temperature. Then, thereafter, the controller 12 is configured to control the rotational speed of the cooling fan 5 so that the rotational speed of the cooling fan 5 is increased as the coolant outlet temperature TWO increases. The cooling fan 5 is driven until the coolant inlet temperature TWI detected by the inlet temperature sensor 10 falls to a set value. Since the increase in the rotational speed of the cooling fan 5 causes the heat exchanger 4 to provide further cooling of the coolant, the temperature rise of the coolant liquid can be suppressed.

When the coolant inlet temperature TWI falls to the set value in step S404, the controller 12 is configured to end the thermal shock prevention processing. In the second embodiment, it is also acceptable for the three-way valve 8 to be a thermo wax type valve since the temperature of the coolant liquid can be adjusted using the cooling fan 5 as described above.

The vehicle cooling system 1 in accordance with the second embodiment has the coolant pump 3 that can be controlled electronically and is configured and arranged such that the rotational speed of the coolant pump 3 is controlled based on the coolant temperature TRW at the heat exchanger 4 and the coolant outlet temperature TWO at the outlet of the vehicle unit 2. As a result, the vehicle cooling system 1 can control the flow rate of the coolant flowing to the heat exchanger 4 and prevent a severe temperature difference from occurring inside the heat exchanger 4, thereby preventing the heat exchanger 4 from being damaged due to thermal shock.

Moreover, in the second embodiment of the present invention, the rotational speed of the cooling fan 5 is controlled simultaneously with the rotational speed of the coolant pump 3 when it is determined that the coolant outlet temperature TWO is continuing to rise. Thus, the heat exchanger 4 can be made to further radiate the heat from the coolant by controlling the rotational speed of the cooling fan 5 when it is highly probable that the amount of heat discharged at the heat exchanger 4 will be insufficient. As a result, the vehicle cooling system 1 in accordance with the second embodiment can prevent a severe temperature difference from occurring inside the heat exchanger 4, thereby preventing the heat exchanger 4 from being damaged due to thermal shock.

Third Embodiment

Figure 6:
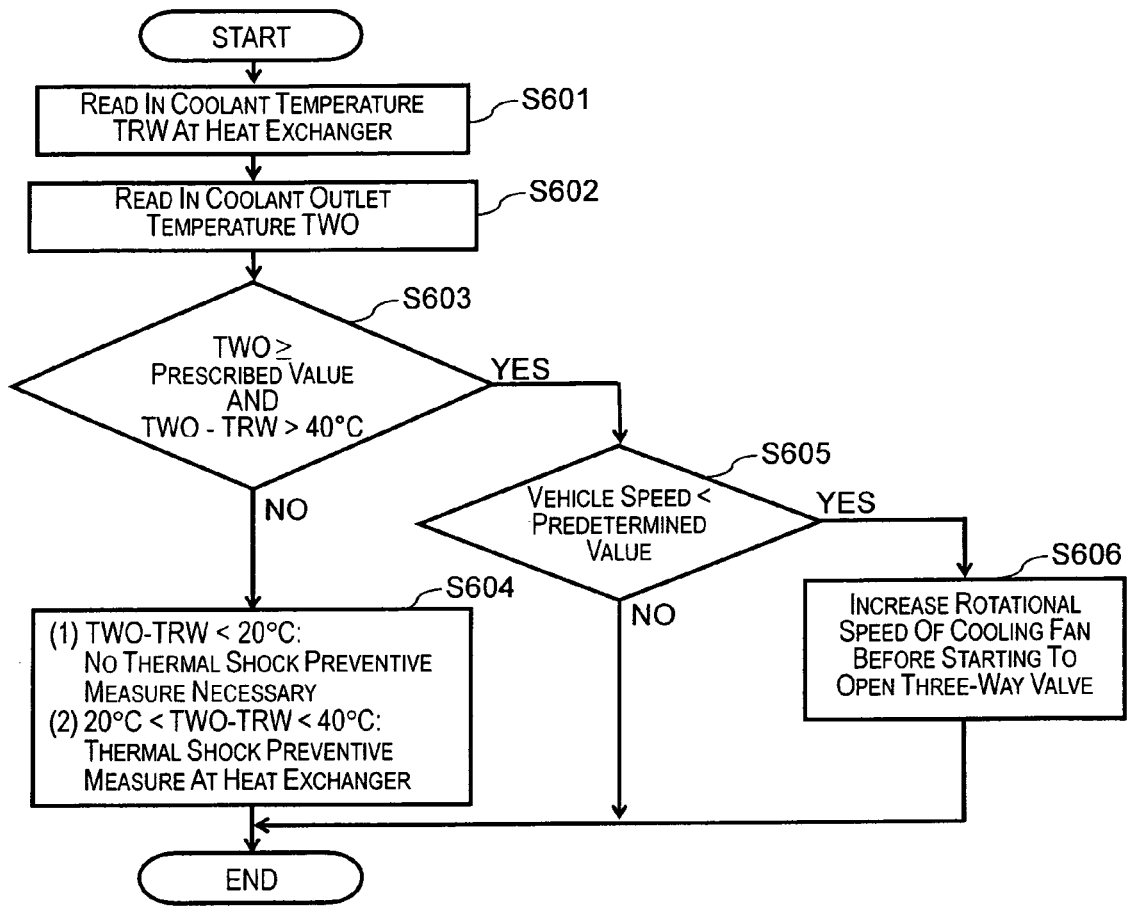
FIG. 6 is a flowchart showing a thermal shock prevention processing executed by the control unit of the vehicle cooling system in accordance with a third embodiment of the present invention.

Referring now to FIG. 6, a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The third embodiment of the present invention is basically identical to the first embodiment explained above except for the control executed in the controller 12. Thus, the constituent components of the vehicle cooling system 1 in accordance with the third embodiment are the same as those of the first embodiment shown in FIG. 1 and detailed descriptions thereof are omitted for the sake of brevity.

FIG. 6 is a flowchart showing the computer processing executed in the controller 12 of the vehicle cooling system 1 in accordance with the third embodiment in order to prevent thermal shock from occurring.

Steps S601 to S604 of FIG. 6 are basically identical to steps S201 to S204 of FIG. 2. More specifically, as shown in FIG. 6, the controller 12 is first configured to read in the coolant temperature TRW at the heat exchanger 4 detected by the heat exchanger temperature sensor 11 (step S601). The controller 12 is then configured to read in the coolant outlet temperature TWO of the vehicle unit 2 detected by the outlet temperature sensor 9 (step S602).

Next, the controller 12 is configured to determine if the coolant outlet temperature TWO of the vehicle unit 2 is equal to or above a prescribed value and a difference between the coolant outlet temperature TWO and the coolant temperature TRW at the heat exchanger 4 (i.e., TWO-TRW) is larger than 40° C. (step S603). If these conditions are not satisfied in step S603, the controller 12 is configured to proceed to step S604.

In step S604, the controller 12 is configured to determine that the thermal shock preventive measure does not have to be taken if the difference between the coolant outlet temperature TWO and the coolant temperature TRW at the heat exchanger 4 is less than 20° C. On the other hand, if the difference between the coolant outlet temperature TWO and the coolant temperature TRW at the heat exchanger 4 is larger than 20° C. and smaller than 40° C. in step S604, the controller 12 is configured to determine the thermal shock can be avoided with a preventive measure at the heat exchanger 4, and thus, the thermal shock prevention in accordance with the present invention need not be executed. After step S604, the controller 12 is configured to end the thermal shock prevention processing.

On the other hand, if the controller 12 determines in step S603 that the coolant outlet temperature TWO of the vehicle unit 2 is equal to or above the prescribed value and the difference between the coolant outlet temperature TWO and the coolant temperature TRW at the heat exchanger 4 is larger than 40° C., the controller 12 is configured to detect the traveling speed of the host vehicle V in which the vehicle cooling system 1 is installed using the vehicle speedometer 13. The controller 12 is further configured to determine if the vehicle speed is lower than a predetermined value (step S605). If the vehicle speed is equal to or above the predetermined value in step S605, the controller 12 is configured to end the thermal shock prevention processing because a sufficient amount of air is being supplied to the heat exchanger 4 and it is not necessary for a special thermal shock prevention control to be executed.

In step S605, if the vehicle speed is lower than the predetermined value, the controller 12 is configured to increase the rotational speed of the cooling fan 5 before beginning to open the three-way valve 8 (which is undergoing normal control) to the heat exchanger route that passes through the heat exchanger 4 (step S606). As a result, the rotational speed of the cooling fan 5 can be increased before the coolant route is switched to the heat exchanger route that directs the coolant to the heat exchanger 4 and before the hot coolant having a higher temperature than the coolant at the heat exchanger 4 flows into the heat exchanger 4.

After increasing the rotational speed of the cooling fan 5 in step S606, the controller 12 is configured to end the thermal shock prevention processing. In the third embodiment, it is also acceptable for the three-way valve 8 to be a thermo wax type valve since the temperature of the coolant liquid can be adjusted using the cooling fan 5 as described above.

The vehicle cooling system 1 in accordance with the third embodiment is configured and arranged to control the amount of cooling air passing across the heat exchanger 4 based on the coolant temperature TRW at the heat exchanger 4 and the coolant outlet temperature TWO at the outlet of the vehicle unit 2. The larger the amount of cooling air that is supplied to the heat exchanger 4, the higher the efficiency of the heat exchanger 4. Thus, the vehicle cooling system 1 can prevent a severe temperature difference from occurring inside the heat exchanger 4, thereby preventing the heat exchanger 4 from being damaged due to thermal shock.

Moreover, the vehicle cooling system 1 in accordance with the third embodiment is configured and arranged to increase the rotational speed of the cooling fan 5 before opening the three-way valve 8 to the heat exchanger route that passes through the heat exchanger 4 and can therefore increase the cooling efficiency of the heat exchanger 4 in advance before increasing the flow rate of the coolant to the heat exchanger 4. As a result, the vehicle cooling system 1 can prevent a severe temperature difference from occurring inside the heat exchanger 4, thereby preventing the heat exchanger 4 from being damaged due to thermal shock.

Furthermore, the vehicle cooling system 1 in accordance with the third embodiment is further configured and arranged to determine if a sufficient amount of cooling air is being supplied to the heat exchanger 4 based on the traveling speed of the host vehicle V in which the vehicle cooling system 1 is installed and to control the rotational speed of the cooling fan 5 based on the traveling speed of the host vehicle V. As a result, the cooling fan 5 can be driven only when there is a possibility that a severe temperature difference will occur inside the heat exchanger 4, and thus, the heat exchanger 4 can be prevented from incurring damage due to thermal shock while also lowering the electric power consumption of the vehicle cooling system 1.

Fourth Embodiment

Figure 7:
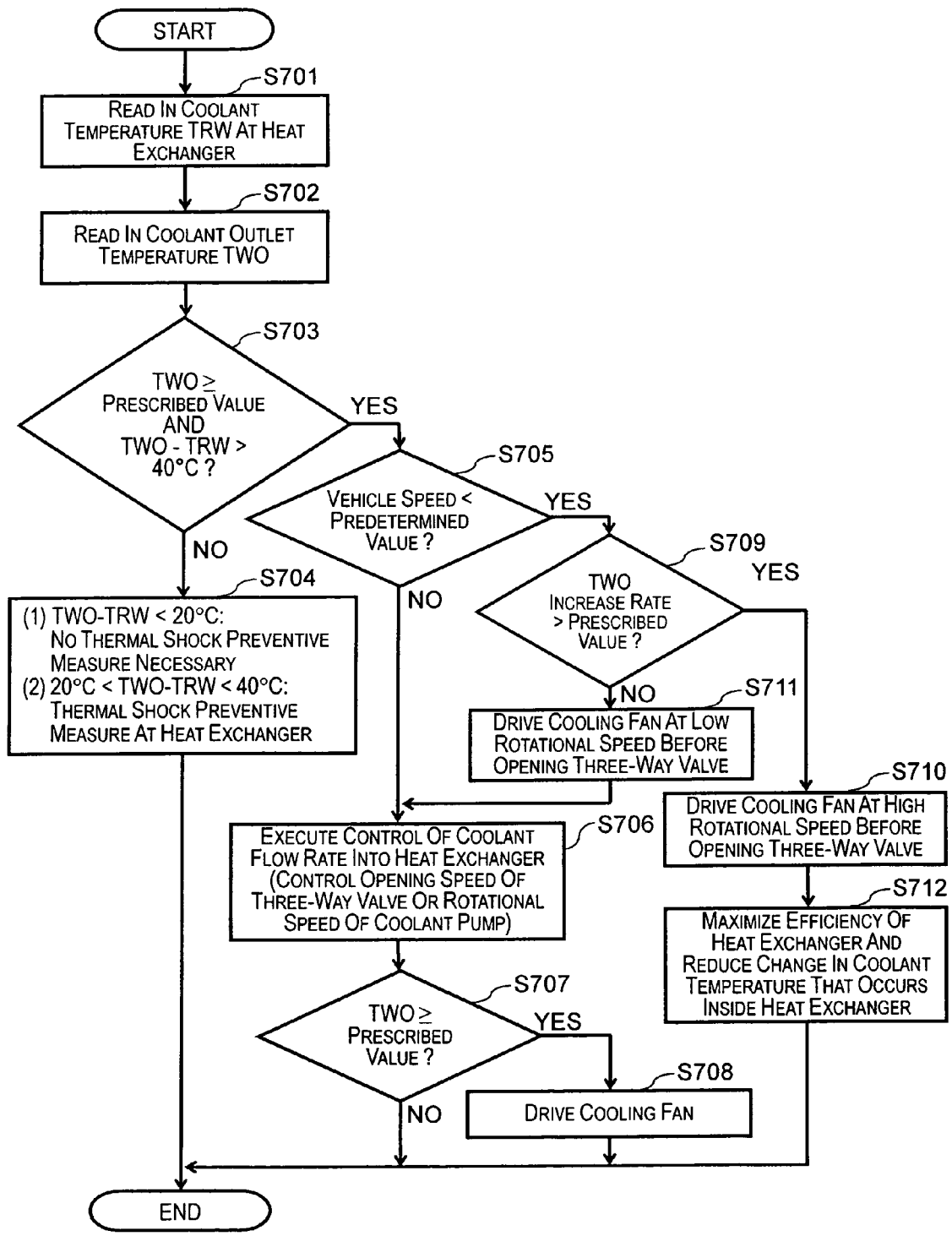
FIG. 7 is a flowchart showing a thermal shock prevention processing executed by the control unit of the vehicle cooling system in accordance with a fourth embodiment of the present invention.
Figure 8:
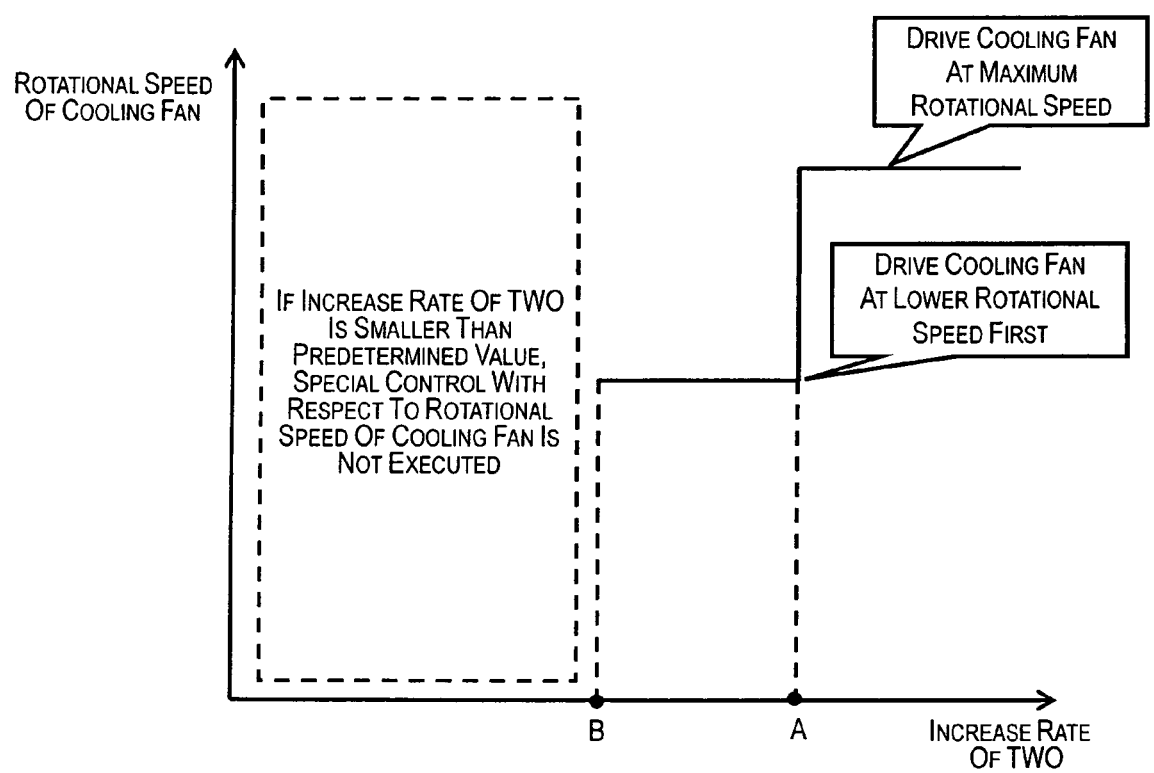
FIG. 8 is a schematic diagram illustrating a manner in which the rotational speed of the cooling fan is controlled based on an increase rate of the temperature of the coolant at the coolant outlet of the vehicle unit in the vehicle cooling system in accordance with the fourth embodiment of the present invention.

Referring now to FIGS. 7 and 8, a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The fourth embodiment of the present invention is basically identical to the first embodiment explained above except for the control executed in the controller 12. Thus, the constituent components of the vehicle cooling system 1 in accordance with the fourth embodiment are the same as those of the first embodiment shown in FIG. 1 and detailed descriptions thereof are omitted for the sake of brevity.

FIG. 7 is a flowchart showing the computer processing executed in the controller 12 of the vehicle cooling system 1 in accordance with the fourth embodiment in order to prevent thermal shock from occurring.

Steps S701 to S704 of FIG. 7 are basically identical to steps S201 to S204 of FIG. 2. More specifically, as shown in FIG. 7, the controller 12 is first configured to read in the coolant temperature TRW at the heat exchanger 4 detected by the heat exchanger temperature sensor 11 (step S701). The controller 12 is then configured to read in the coolant outlet temperature TWO of the vehicle unit 2 detected by the outlet temperature sensor 9 (step S702).

Next, the controller 12 is configured to determine if the coolant outlet temperature TWO of the vehicle unit 2 is equal to or above a prescribed value and a difference between the coolant outlet temperature TWO and the coolant temperature TRW at the heat exchanger 4 (i.e., TWO-TRW) is larger than 40° C. (step S703). If these conditions are not satisfied in step S703, the controller 12 is configured to proceed to step S704.

In step S704, the controller 12 is configured to determine that the thermal shock preventive measure does not have to be taken if the difference between the coolant outlet temperature TWO and the coolant temperature TRW at the heat exchanger 4 is less than 20° C. On the other hand, if the difference between the coolant outlet temperature TWO and the coolant temperature TRW at the heat exchanger 4 is larger than 20° C. and smaller than 40° C. in step S704, the controller 12 is configured to determine the thermal shock can be avoided with a preventive measure at the heat exchanger 4, and thus, the thermal shock prevention in accordance with the present invention need not be executed. After step S704, the controller 12 is configured to end the thermal shock prevention processing.

On the other hand, if the controller 12 determines in step S703 that the coolant outlet temperature TWO of the vehicle unit 2 is equal to or above the prescribed value and the difference between the coolant outlet temperature TWO and the coolant temperature TRW at the heat exchanger 4 is larger than 40° C., the controller 12 is configured to determine if the traveling speed of the host vehicle V in which the system is installed is lower than a predetermined value (step S705). If the vehicle speed is equal to or above the predetermined value, the controller 12 is configured to control the flow rate of the coolant flowing into the heat exchanger 4 (step S706). The control of the flow rate of the coolant mentioned here involves such actions as reducing the opening speed with which the three-way valve 8 switches the coolant route to the heat exchanger route or lowering the rotational speed of the coolant pump 3.

The controller 12 is then configured to determine if the coolant flow rate control has caused the coolant outlet temperature TWO to increase to or above a prescribed value (step S707). If the coolant outlet temperature TWO has not reached or exceeded the prescribed value in step S707, the controller 12 is configured to determine that a special thermal shock preventive measure is not necessary and to end the thermal shock prevention processing.

If the controller 12 determines that the coolant outlet temperature TWO is equal to or above the prescribed value in step S707, the controller 12 is configured to control the rotational speed of the cooling fan 5 (step S708). More specifically, in step S708, the controller 12 is configured to start the cooling fan 5 if the cooling fan 5 is not yet rotating and increases the rotational speed if the cooling fan 5 has already been started in step S711 (discussed later). After step S708, the controller 12 is configured to end the thermal shock prevention processing.

On the other hand, if the controller 12 determines that the vehicle speed is lower than the predetermined value in step S705, the controller 12 is configured to determine if the increase rate (° C./s) of the coolant outlet temperature TWO is larger than a prescribed value (step S709). If the increase rate of the coolant outlet temperature TWO is larger than the prescribed value, the controller 12 is configured to control the rotational speed of the cooling fan 5 at a higher rotational speed before the three-way valve 8 begins to open to the heat exchanger route that passes through the heat exchanger 4 (step S710). Conversely, if the increase rate of the coolant outlet temperature TWO is equal to or smaller than the prescribed value, the controller 12 is configured to control the rotational speed of the cooling fan 5 at a lower rotational speed before the three-way valve 8 begins to open to the heat exchanger route that passes through the heat exchanger 4 (step S711). As a result, the rotational speed of the cooling fan 5 can be increased before the cooling route is switched the coolant route to the heat exchanger route that passes through the heat exchanger 4 and before hot coolant having a higher temperature than the coolant at the heat exchanger 4 flows into the heat exchanger 4.

The manner in which the rotational speed of the cooling fan 5 is controlled in steps S710 and S711 is illustrated in FIG. 8. If the increase rate of the coolant outlet temperature TWO of the vehicle unit 2 is larger than a prescribed value A in step S709, the controller 12 is configured to drive the cooling fan 5 at the maximum rotational speed in step S710. If the increase rate is equal to or smaller than the prescribed value A in step S709 and the increase rate is equal to or larger than a prescribed value B, the controller 12 is configured to drive the cooling fan 5 at a rotational speed of approximately 60% of the maximum rotational speed in step S711. This lower rotational speed used in step S711 is changed in accordance with the vehicle conditions.

If the controller 12 has executed step S711 to drive the cooling fan 5 at a lower rotational speed, the controller 12 is configured to proceed to step S706 to execute the processing of steps S706 to S708 explained above. Conversely, if the controller 12 has executed step S710 to drive the cooling fan 5 at a higher rotational speed, the controller 12 is configured to proceed to step S712. Since the cooling fan 5 is driven at the maximum rotational speed in step S710, the efficiency of the heat exchanger 4 can be maximized and the amount by which the temperature inside the heat exchanger 4 changes during the transitional period after the three-way valve 8 is opened and hot coolant flows into the heat exchanger 4 is reduced. After step S712, the controller 12 is configured to end the thermal shock prevention processing.

The vehicle cooling system 1 in accordance with the fourth embodiment is configured and arranged to control at least one of the cooling fan 5, the coolant pump 3, and the three-way valve 8 based on the coolant temperature TRW at the heat exchanger 4 and the coolant outlet temperature TWO of the vehicle unit 2. As a result, when the difference between the coolant outlet temperature TWO of the vehicle unit 2 and the coolant temperature TRW at the heat exchanger 4 is large and it is highly probable that thermal shock will occur in the heat exchanger 4, the vehicle cooling system 1 can control the flow rate of the coolant and the amount of cooling air and prevent a severe temperature difference from occurring inside the heat exchanger 4, thereby preventing the heat exchanger 4 from being damaged due to thermal shock.

Also, the vehicle cooling system 1 in accordance with the fourth embodiment is configured and arranged to control the amount of cooling air passing across the heat exchanger 4 based on the coolant temperature TRW at the heat exchanger 4 and the coolant outlet temperature TWO at the outlet of the vehicle unit 2. The larger the amount of cooling air that is supplied to the heat exchanger 4, the higher the efficiency of the heat exchanger 4. Thus, the vehicle cooling system 1 can prevent a severe temperature difference from occurring inside the heat exchanger 4, thereby preventing the heat exchanger 4 from being damaged due to thermal shock.

Moreover, the vehicle cooling system 1 in accordance with the fourth embodiment is configured and arranged to increase the rotational speed of the cooling fan 5 before opening the three-way valve 8 to the heat exchanger route that passes through the heat exchanger 4 and can therefore increase the cooling efficiency of the heat exchanger 4 in advance before increasing the flow rate of the coolant. As a result, the vehicle cooling system 1 can prevent a severe temperature difference from occurring inside the heat exchanger 4, thereby preventing the heat exchanger 4 from being damaged due to thermal shock.

Furthermore, the vehicle cooling system 1 in accordance with the fourth embodiment is further configured and arranged to determine if a sufficient amount of cooling air is being supplied to the heat exchanger 4 based on the traveling speed of the host vehicle V in which the vehicle cooling system 1 is installed and to control the rotational speed of the cooling fan 5 based on the traveling speed of the host vehicle V. As a result, the cooling fan 5 can be driven only when there is a possibility that a severe temperature difference will occur inside the heat exchanger 4 and, thus, the heat exchanger 4 can be prevented from incurring damage due to thermal shock while also lowering the electric power consumption of the system 1.

Since the flow rate of the coolant flowing into the heat exchanger 4 and the amount of cooling air passing across the heat exchanger 4 are controlled simultaneously, the vehicle cooling system 1 in accordance with the fourth embodiment can more effectively prevent a severe temperature difference from occurring inside the heat exchanger 4, thereby preventing the heat exchanger 4 from being damaged due to thermal shock.

Fifth Embodiment

Figure 9:
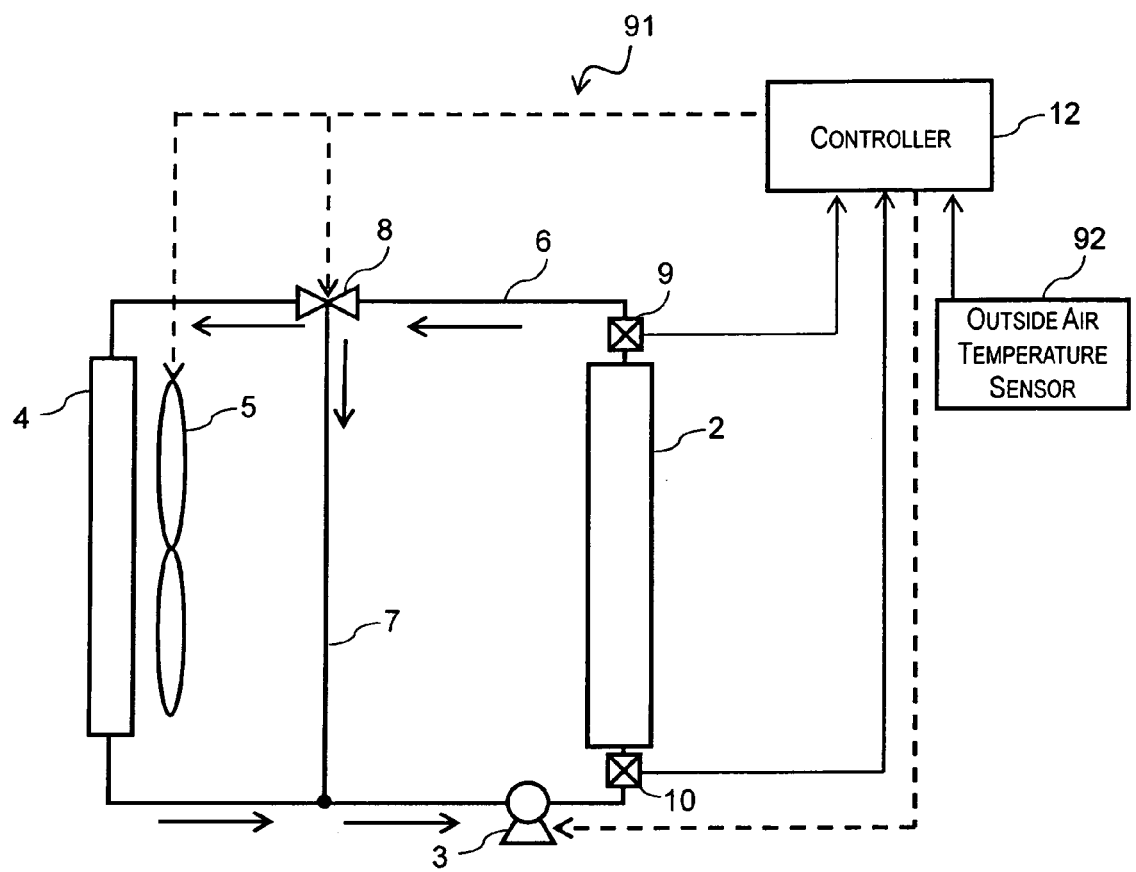
FIG. 9 is a block diagram showing constituent components of a vehicle cooling system in accordance with a fifth embodiment of the present invention.
Figure 10:
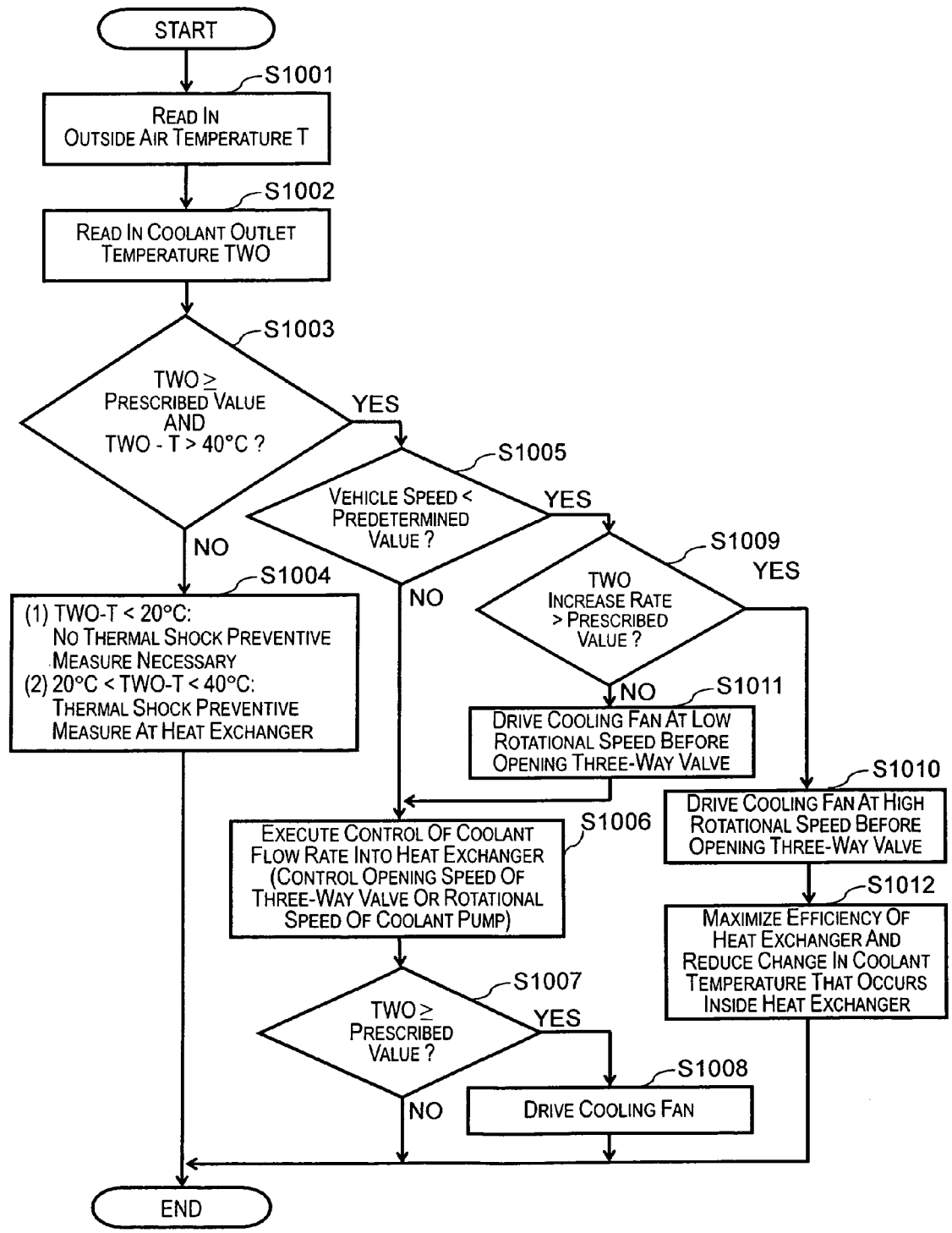
FIG. 10 is a flowchart showing a thermal shock prevention processing executed by a control unit of the vehicle cooling system in accordance with the fifth embodiment of the present invention.

Referring now to FIGS. 9 and 10, a vehicle cooling system 91 in accordance with a fifth embodiment will now be explained. In view of the similarity between the first, fourth and fifth embodiments, the parts of the fifth embodiment that are identical to the parts of the first or fourth embodiment will be given the same reference numerals as the parts of the first or fourth embodiment. Moreover, the descriptions of the parts of the fifth embodiment that are identical to the parts of the first or fourth embodiment may be omitted for the sake of brevity.

FIG. 9 is a block diagram showing the constituent components of the vehicle cooling system 91 in accordance with the fifth embodiment. As shown in FIG. 9, the vehicle cooling system 91 of the fifth embodiment differs from the vehicle cooling system 1 of the first embodiment in that the vehicle cooling system 91 is provided with an outside air temperature sensor 92 for detecting an outside air temperature T instead of the heat exchanger temperature sensor 11 (FIG. 1) for detecting the coolant temperature at the heat exchanger 4. Otherwise, the constituent components of the vehicle cooling system 91 of the fifth embodiment are the same as those of the vehicle cooling system 1 of the first embodiment explained above, and detailed explanations thereof are omitted for the same of brevity. The vehicle cooling system 91 of the fifth embodiment can be installed in the host vehicle V as shown in FIG. 1 in place of the vehicle cooling system 1 of the first embodiment.

The outside air temperature sensor 92 does not need to be specially installed for the purpose of controlling the vehicle cooling system 91. Instead, the outside air temperature sensor 92 can be a conventional outside air temperature sensor used for controlling a conventional air conditioning system, an intake air temperature sensor for controlling the intake air quantity, or other sensor installed for some other purposes for controlling the host vehicle V. The outside air temperature T detected by the outside air temperature sensor 92 is fed to the controller 12.

The computer processing executed in the controller 12 of the vehicle cooling system 91 in accordance with the fifth embodiment in order to prevent thermal shock from occurring will now be explained with reference to FIG. 10. FIG. 10 is a flowchart showing the thermal shock prevention processing executed by the vehicle cooling system 91 in accordance with the fifth embodiment.

As shown in FIG. 10, the controller 12 is first configured to read in the outside air temperature T detected by the outside air temperature sensor 92 (step S1001). In step S1002 and the subsequent steps, the outside temperature T is assumed to be approximately equal to the coolant temperature at the heat exchanger 4, and thus, the outside temperature T is used as the coolant temperature TRW at the heat exchanger 4. Therefore, processing executed in steps S1002 to S1012 of FIG. 10 are identical to the processing executed in steps 702 to 712 of the fourth embodiment shown in FIG. 7 except that the coolant temperature TRW at the heat exchanger 4 in the processing shown in FIG. 7 is replaced by the outside temperature T in the processing shown in FIG. 10. Since steps S702 to S712 of FIG. 7 correspond to steps S1002 to S1012 of FIG. 10, detailed explanations of the latter are omitted here for the sake of brevity.

Instead of using the detected outside air temperature T as the coolant temperature TRW at the heat exchanger 4, it is also acceptable to, for example, use a conversion formula or conversion table to calculate the coolant temperature TRW at the heat exchanger 4 based on the detected outside air temperature T.

Since the vehicle cooling system 91 in accordance with the fifth embodiment uses the outside air temperature T instead of the coolant temperature TRW at the heat exchanger 4 in the control processing, the control can be accomplished using a sensor that is already installed in the host vehicle V and the number of parts in the vehicle cooling system 91 can be reduced.

Sixth Embodiment

Figure 11:
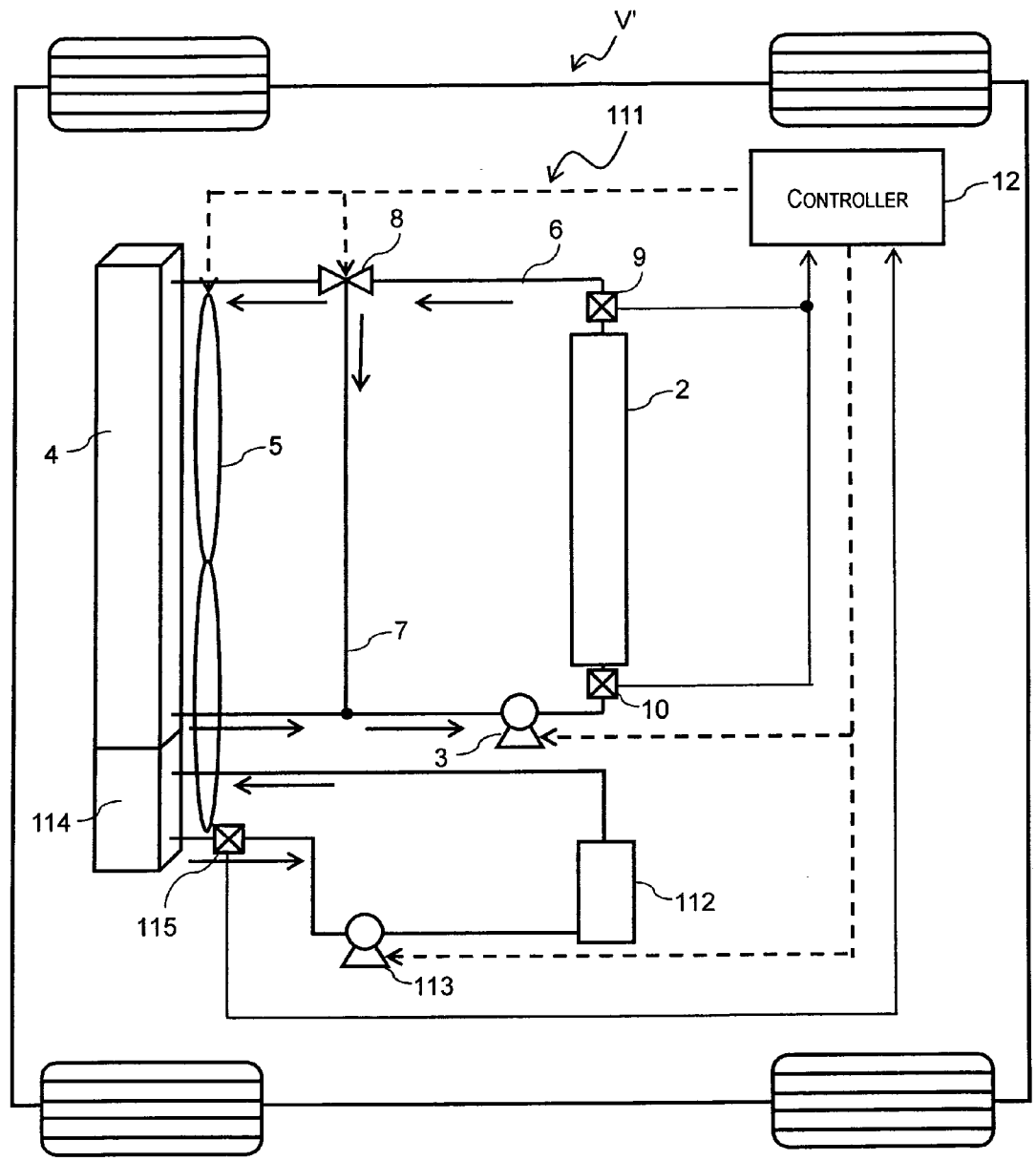
FIG. 11 is a block diagram showing constituent components of a vehicle cooling system in accordance with a sixth embodiment of the present invention.
Figure 12:
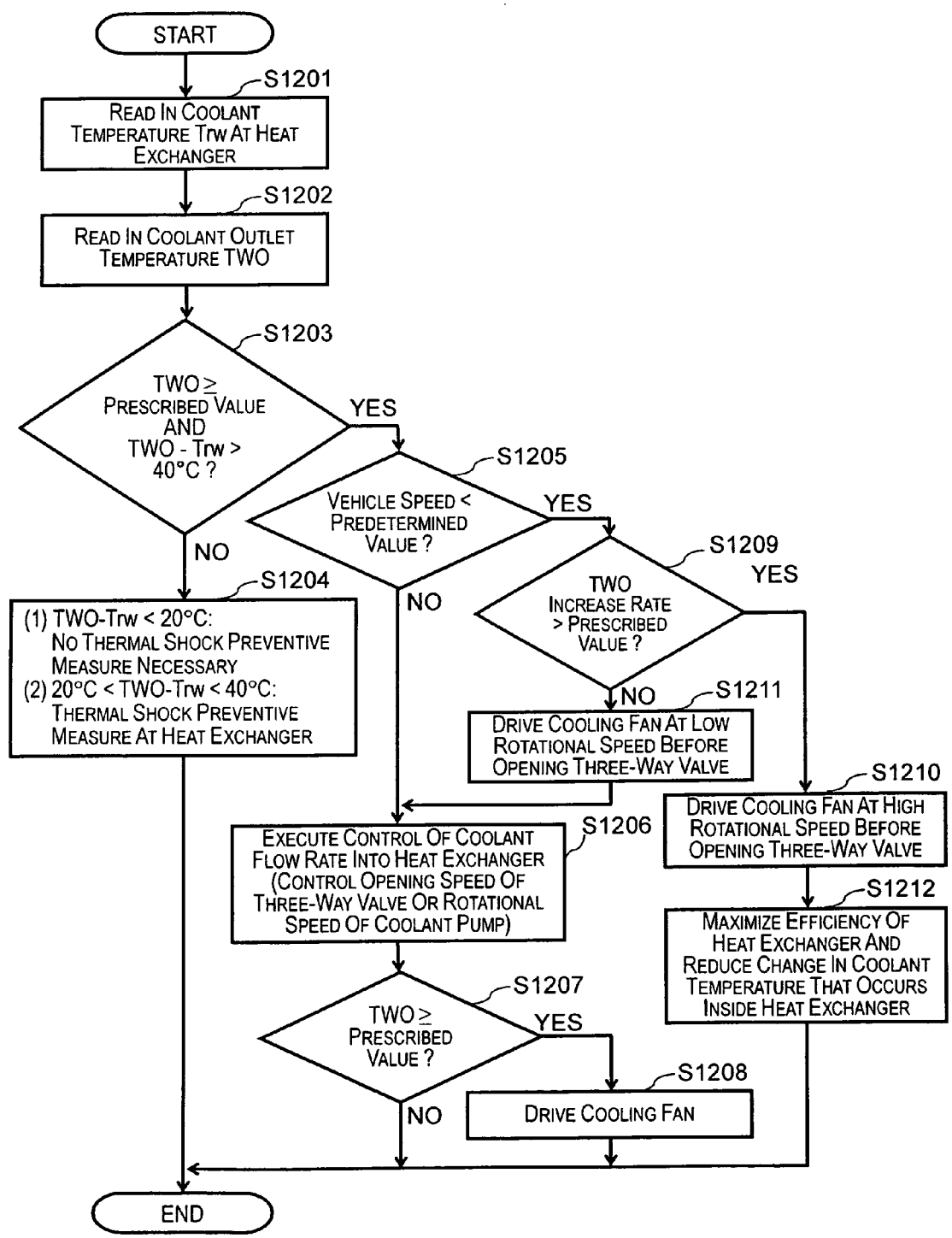
FIG. 12 is a flowchart showing a thermal shock prevention processing executed by a control unit of the vehicle cooling system in accordance with the sixth embodiment of the present invention.

Referring now to FIGS. 11 and 12, a vehicle cooling system 111 in accordance with a sixth embodiment will now be explained. In view of the similarity between the first, fourth and sixth embodiments, the parts of the sixth embodiment that are identical to the parts of the first or fourth embodiment will be given the same reference numerals as the parts of the first or fourth embodiment. Moreover, the descriptions of the parts of the sixth embodiment that are identical to the parts of the first or fourth embodiment may be omitted for the sake of brevity.

FIG. 11 is a block diagram showing the constituent components of the vehicle cooling system 111 in accordance with the sixth embodiment. As shown in FIG. 11, the vehicle cooling system 111 is adapted to a host vehicle V' in which two or more separate cooling circuits exist in a cooling system, e.g., a hybrid vehicle or a fuel cell vehicle. Thus, the vehicle cooling system 111 in accordance with the sixth embodiment differs from the vehicle cooling system 1 shown in FIG. 1 in that the vehicle cooling system 111 is further provided with an additional cooling system for cooling an additional vehicle unit 112. The additional cooling system includes the vehicle unit 112, a coolant pump 113, an additional heat exchanger 114, and a heat exchanger temperature sensor 115. The other constituent components are the same as those of the first embodiment and detailed explanations thereof are omitted here for the sake of brevity.

The additional vehicle unit 112 is configured and arranged to generate heat. The vehicle unit 2 and the additional vehicle unit 112 correspond to, for example, a fuel cell and an electric motor in the case of the host vehicle V' being a fuel cell vehicle, or an engine and an electric motor in the case of the host vehicle V' being a hybrid vehicle.

The coolant pump 113 is configured and arranged to circulate a coolant to the additional vehicle unit 112. The coolant pump 113 is configured and arranged such that a rotational speed thereof is controlled by the controller 12. The controller 112 is preferably configured to selectively control operations of the coolant pump 3 and the coolant pump 113 simultaneously or independently as necessary.

The heat exchanger 114 is configured and arranged to cool the coolant circulated from the additional vehicle unit 112. The heat exchanger 114 is preferably integrated with the heat exchanger 4 to form a heat exchanger unit. Thus, the temperature of the coolant flowing through the heat exchanger 4 is substantially close to the temperature of the coolant flowing through the heat exchanger 114.

The heat exchanger temperature sensor 115 is configured and arranged to detect a coolant temperature Trw at the heat exchanger 114 and to feed a resulting detection signal to the controller 12. In the sixth embodiment of the present invention, a separate temperature sensor is not provided for the heat exchanger 4.

The cooling fan 5 in the sixth embodiment is preferably configured and arranged to blow cooling air to the heat exchanger unit including the heat exchanger 4 and the heat exchanger 114.

The computer processing executed in the controller 12 of the vehicle cooling system 111 in accordance with the sixth embodiment in order to prevent thermal shock from occurring will now be explained with reference to FIG. 12. FIG. 12 is a flowchart showing the thermal shock prevention processing executed by the vehicle cooling system 111 in accordance with the sixth embodiment.

As shown in FIG. 12, the controller 12 is first configured to read in the coolant temperature Trw at the heat exchanger 114 detected by the heat exchanger temperature sensor 115 (step S1201). In step S1202 and the subsequent steps, the coolant temperature Trw at the heat exchanger 114 is assumed to be approximately equal to the coolant temperature TRW at the heat exchanger 4, and thus, the coolant temperature Trw at the heat exchanger 114 is used as the coolant temperature at the heat exchanger 4. Therefore, processing executed in steps S1202 to S1212 of FIG. 12 are identical to the processing executed in steps 702 to 712 of the fourth embodiment shown in FIG. 7 except that the coolant temperature TRW at the heat exchanger 4 in the processing shown in FIG. 7 is replaced by the coolant temperature Trw at the heat exchanger 114 in the processing shown in FIG. 12. Since steps S702 to S712 of FIG. 7 correspond to steps S1202 to S1212 of FIG. 12, detailed explanations of the latter are omitted here for the sake of brevity.

Instead of using the detected coolant temperature Trw at the heat exchanger 114 as the coolant temperature TRW at the heat exchanger 4, it is also acceptable to, for example, use a conversion formula or conversion table to calculate the coolant temperature TRW at the heat exchanger 4 based on the detected coolant temperature Trw at the heat exchanger 114.

The vehicle cooling system 111 in accordance with the sixth embodiment is configured and arranged such that even if the heat exchanger unit comprises an integrated combination of a plurality of heat exchangers 4 and 14, at least one of the cooling fan 5, the coolant pumps 3 and 113, and the three-way valve 8 is controlled based on the coolant temperature at one of the heat exchangers 4 and 114 (i.e., the heat exchanger 114 in this embodiment) and the coolant outlet temperature TWO at the coolant outlet of the vehicle unit 2. Thus, thermal shock can be prevented from occurring in a plurality of heat exchangers using the coolant temperature of only one of the heat exchangers (i.e., the heat exchanger 114 in this embodiment). As a result, the vehicle cooling system 111 can prevent the heat exchangers from being damaged due to thermal shock while also reducing the number of parts.

Accordingly, the vehicle cooling system in accordance with the present invention is configured and arranged to control at least one of the cooling fan, the coolant pump, and the three-way valve based on the coolant temperature at the heat exchanger and the coolant temperature at the outlet of the vehicle unit. Thus, when the difference between the coolant temperature at the heat exchanger and the coolant temperature at the outlet of the vehicle unit is large and there is the possibility that the heat exchanger will undergo thermal shock, the flow rate of the coolant and the speed of the cooling air can be controlled to prevent a severe temperature difference from occurring inside the heat exchanger, thereby preventing the heat exchanger from being damaged due to thermal shock.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle cooling system comprising:
a vehicle unit having a coolant outlet and a coolant inlet with a coolant route therebetween;
a heat exchanger configured and arranged in the coolant route to selectively receive a coolant from the coolant outlet of the vehicle unit;
a cooling fan configured and arranged to blow cooling air to the heat exchanger;
a coolant pump configured and arranged to circulate the coolant through the coolant route;
a three-way valve configured and arranged to switch the coolant route between a heat exchanger route that passes through the heat exchanger and a bypass route that bypasses the heat exchanger; and
a control unit that controls operation of the three-way valve based on a temperature of the coolant at the heat exchanger and a temperature of the coolant at the coolant outlet of the vehicle unit,
the control unit electrically controlling an opening speed of the three-way valve with which the coolant route is switched from the bypass route to the heat exchanger route upon detection of the temperature of the coolant at the heat exchanger and the temperature of the coolant at the coolant outlet by the control unit, the control unit controlling the opening speed to switch the coolant route from the bypass route to the heat exchanger route such that as a difference between the temperature of the coolant at the coolant outlet of the vehicle unit and the temperature of the coolant at the heat exchanger becomes larger, the opening speed of the three-way valve becomes slower, with the opening speed being a percentage of the three-way valve that is opened per unit time.

2. The vehicle cooling system recited in claim 1, wherein the control unit controls a flow rate of the coolant flowing into the heat exchanger based on the temperature of the coolant at the heat exchanger and the temperature of the coolant at the coolant outlet of the vehicle unit.

3. The vehicle cooling system recited in claim 1, wherein the control unit controls operation of the three-way valve so that a flow rate of the coolant flowing into the heat exchanger is adjusted based on the temperature of the coolant at the heat exchanger and the temperature of the coolant at the coolant outlet of the vehicle unit.

4. The vehicle cooling system recited in claim 1, wherein the control unit electronically controls a rotational speed of the coolant pump.

5. The vehicle cooling system as recited in claim 1, wherein the control unit electronically controls a rotational speed of the coolant pump and a rotational speed of the cooling fan simultaneously.

6. The vehicle cooling system as recited in claim 1, wherein the control unit controls an amount of the cooling air passing across the heat exchanger.

7. The vehicle cooling system as recited in claim 1, wherein the control unit simultaneously controls a flow rate of the coolant flowing into the heat exchanger and an amount of the cooling air passing across the heat exchanger.

8. The vehicle cooling system as recited in claim 1, wherein the control unit controls the operation of the three-way valve based on the temperature of the coolant at the coolant outlet of the vehicle unit and a difference between the temperature of the coolant at the coolant outlet of the vehicle unit and the temperature of the coolant at the heat exchanger.

9. A vehicle cooling system comprising:
heat exchanging means for cooling a coolant that has been warmed by a vehicle unit;
coolant circulating means for circulating the coolant along a coolant route between the vehicle unit and the heat exchanging means;
valve means for switching the coolant route between a heat exchanger route that passes through the heat exchanging means and a bypass route that bypasses the heat exchanging means;
controlling means for controlling a flow rate of the coolant flowing into the heat exchanging means via the valve means based on the temperature of the coolant at the heat exchanging means and the temperature of the coolant at a coolant outlet of the vehicle unit, the controlling means also electrically controlling an opening speed of the valve means with which the coolant circulating means is switched from the bypass route to the heat exchanger route such that as a difference between the temperature of the coolant at the coolant outlet of the vehicle unit and the temperature of the coolant at the heat exchanging means becomes larger, the opening speed of the valve means becomes slower, with the opening speed being a percentage of the valve means that is opened per unit time.

* * * * *